L. D. CLIFT.
Improvement in the Methods of Making Spades and Shovels.
No. 115,166.                                        Patented May 23, 1871.
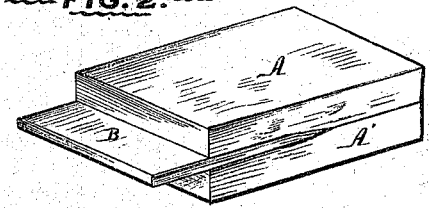
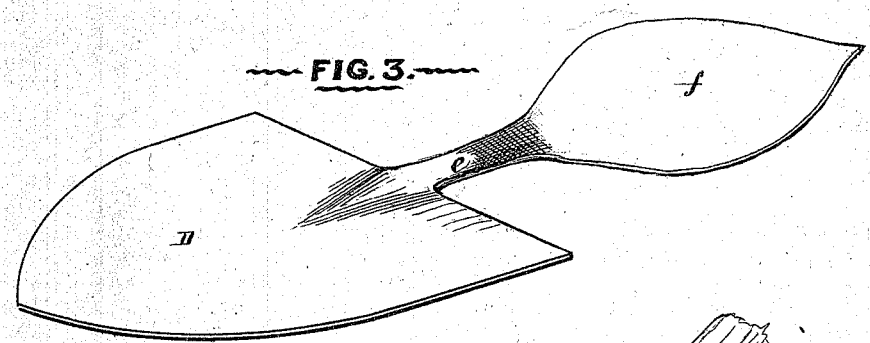
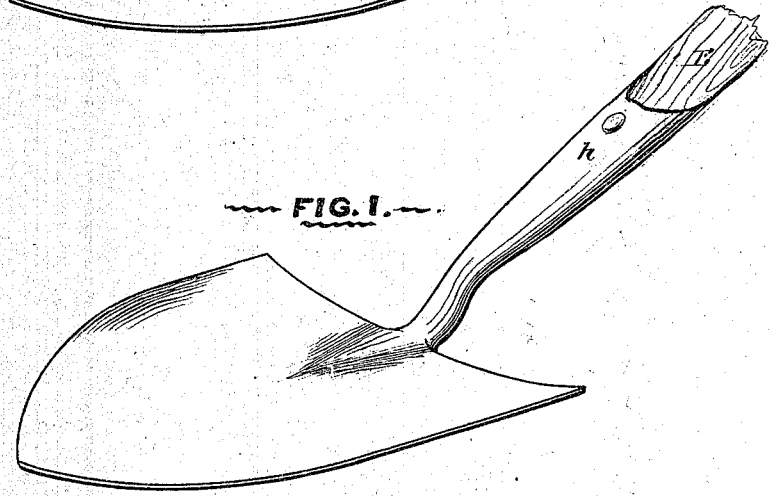
Witnesses: Jno. B. Harding, Thomas McIlvain
L. D. Clift
by his Atty
Howson and Son 115,166

UNITED STATES PATENT OFFICE.

LEVI DEWES CLIFT, OF PHILADELPHIA, PENNSYLVANIA.

IMPROVEMENT IN THE METHODS OF MAKING SPADES AND SHOVELS.

Specification forming part of Letters Patent No. 115,166, dated May 23, 1871.

I, LEVI DEWES CLIFT, of Philadelphia, county of Philadelphia, State of Pennsylvania, have invented an Improved Shovel or Spade, of which the following is a specification:

My invention relates to an improvement in the manufacture of shovels or spades having solid shanks and sockets; and my improvement consists in forging the blade, solid shank, and socket from one piece of metal, as described hereafter, the usual socket, which demands tedious operations in its manufacture, being discarded and the shovel or spade being much more substantial than those having common sockets.

Description of the Accompanying Drawing.

Figure 1 is a perspective view of a shovel or spade constructed according to my improvement, and Figs. 2 and 3 perspective views illustrating the mode of manufacturing the same.

General Description.

I take two bars, A and A', of iron, or a bar bent over and doubled, and between the folds insert a plate, B, of steel. After reducing the whole to a welding-heat, I proceed to form it by tilt or other hammers, as shown in Fig. 3, one end being spread to the desired shape of the blade, while the other end is reduced to a contracted neck or shank, $e$, beyond which a thin flat web, $f$, is formed; and this web I turn and fold so that it becomes a socket, $h$, for the handle E. The socket and shank are then bent so as to assume that position in respect to the blade which the character of the spade or shovel may suggest.

It will be seen that by the above process the shank and socket are forged from the same material as and form part of the blade, and that the manipulation required in forming the ordinary sockets and shanks is obviated, and that the bent solid shank affords a most substantial medium for connecting the handle to the blade.

Without confining myself to any specific form of blade, or to the mode described of inserting and securing the steel edge-piece,

I claim—

The method herein described of manufacturing a shovel or spade with the blade, socket, and solid shank of one piece of metal.

In testimony whereof I have signed my name to this specification in the presence of two subscribing witnesses.

LEVI D. CLIFT.

Witnesses:
   H. HOWSON,
   FRANKLIN B. RICHARDS.